Feb. 18, 1964 F. SCHRÖTER 3,121,872

SIGNAL RECORDING SYSTEM AND METHOD

Filed March 11, 1959

Inventor:
Fritz Schröter
By [signature]
Patent Agent 3,121,872

SIGNAL RECORDING SYSTEM AND METHOD

Fritz Schröter, Neu-Ulm (Danube), Germany, assignor to Telefunken Aktiengesellschaft, Berlin, Germany Filed Mar. 11, 1959, Ser. No. 798,675
Claims priority, application Germany Mar. 14, 1958
7 Claims. (Cl. 346—74)

Figure 1:
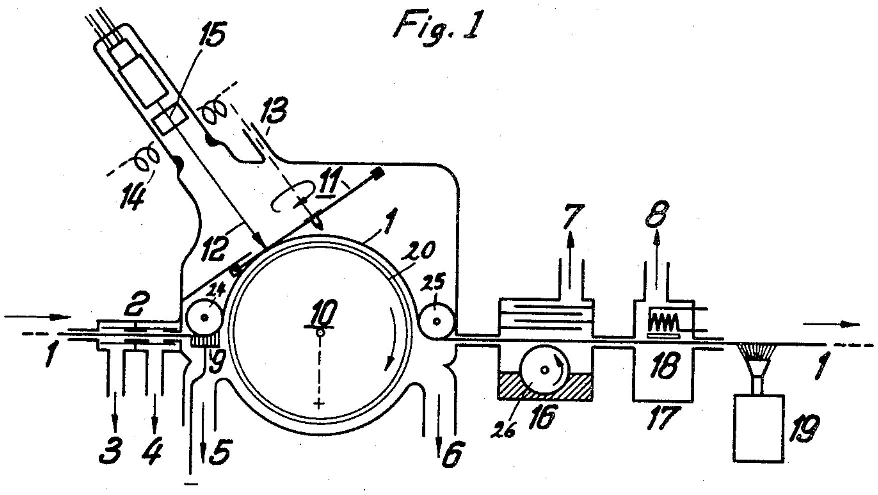

The present invention relates to a system for recording and permanently storing signals, particularly picture signals.

It has been known to directly use a cathode ray beam, which is controlled as to position and intensity, for the static charging of an insulated carrier band at the point of impact of the beam, said cathode ray beam being modulated by a signal to be stored and the charges thus stored being rendered visible and permanent by spraying with a fine powder.

It is an object of the present invention to provide the storing of the recording in a new and more efficient manner, i.e., in an indirect way by converting the signal into an intensity modulation and controlling thereby a light sensitive resistance layer which acts secondary as a locally modulated conductor to electrostatically bias the carrier band.

It is a further object of the present invention to apply static bias on the carrier band.

It is another object of the invention to apply on a storage band a photoelectric sensitive resistance layer by moving means travelling at the same speed as the band.

It is a further object of the invention to subject the band to an intensity modulation by transverse scanning, said modulation reproducing the signal to be stored.

It is a still further object of the invention to advance the storage band while maintaining close electrical contact with a light modulated device for locally distributing conductive charges, said device travelling synchronously with the band and having continuously and quantitatively controlled conductance to determine the bias charge on the band, the device travelling such a long path that the persistence of the conductivity of the storage band is utilized.

The system and method according to the invention will be explained with reference to a device for storing a large sequence of pictures, wherein it is assumed that individual picture lines are recorded in a known manner transversely to the direction of travel of the insulated storage band, while the band moves continuously rather than intermittently at a speed which is adapted to the changing scanning pattern.

The picture signal is first reproduced on a luminous screen as a genuine intensity modulation by a modulated cathode ray beam deflected transversely of the storage band. The luminous screen carrier is made of a thin and light permeable foil. The storage band runs closely past the luminous screen on a sufficiently wide roller, the cylindrical surface of which is uniformly coated with a thin layer of a photo-sensitive semi-conductor, as for instance cadmium sulfide, antimony sulfide, selenium, zinc oxide, lead oxide or lead sulfide. The highly transparent storage band snugly engages this resistance layer and by means of a mechanical coupling, it is assured that the circumferential speed of the roller conforms exactly to the feed speed of the storage band, i.e., that no relative movement takes place. The luminous screen, due to the very thin foil supporting it, has a close dispersion-free optical contact with the storage band rolling thereunder and with the photo-sensitive resistance layer provided directly under the storage band. If, for example, the foil carrying the luminous screen is of a thickness of 3 microns, and if its distance from the transparent storage band is 3 to 4 microns, and if the storage band has a thickness of 6 microns, then the distance between the luminous screen and the semi-conductor layer is about 12 to 13 microns. If the entire picture line comprises 600 picture points, and if its overall length on the storage band is assumed to be 50 mm. corresponding to the width of the band, then a single picture element is about 80 microns long. Thus, the light ray from the luminous screen to the semi-conductor layer is small compared to the size of the individual picture points which is necessary for good resolution.

In the system described in the foregoing, a long contact between the storage band and the photoelectrically energized resistance layer is essential. The semi-conductor materials mentioned in the foregoing, as well as others suitable for this purpose, all have long persistence characteristics of their electrical conductivity after energization by light, which means that the locally controlled conductance of the electrostatic bias on the storage band can be completed during the available contact time.

Still further objects and the entire scope of applicability for the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
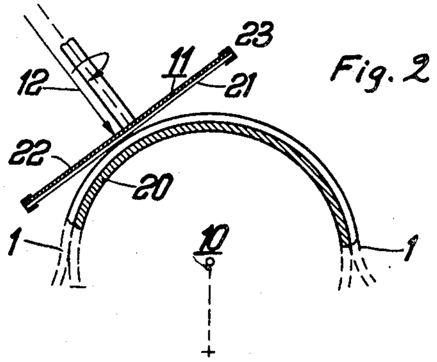

In the drawings:

FIGURE 1 is a schematic diagram of a system for carrying out the novel method, and FIGURE 2 is an enlarged schematic representation of a portion of the system.

The insulated storage band 1, shown in FIGURE 1, runs through a vacuum apparatus in the direction of the arrow entering the apparatus through a pressure seal 2, said pressure seal comprising separate chambers which are kept at suitable levels of partial vacuum by means of pump lines to be connected at 3 and 4. 5 and 6 denote further connections to lines for producing the high vacuum required for operating a cathode ray beam. 7 and 8 are suction lines for obtaining the desired degree of pressure reduction in a dusting chamber 16 and in a vibration chamber 17, respectively. By contact with a metallic brush 9, the insulated storage band 1 is charged in the high vacuum chamber to several thousand volts negative (or positive) from a high voltage source. The storage band 1 with its charged side is then resiliently applied to a cylindrical roller 10 by means of guide rollers 24 and 25, said cylindrical roller 10 having a large diameter and being substantially as wide as the band 1. The roller 10 is coated on the outer periphery with a light-sensitive layer 20 of a photo-sensitive material.

The pheripheral portion of the roller 10 is conductive and is connected to the positive (or negative) terminal of a high voltage source (not shown). Thus, in the exposed parts of the photo-resistive coating 20, the bias charge on the storage band 1 will flow to the opposite terminal of the high voltage source through the layer 20 of the resistive material. The signal-modulated cathode ray beam 12 will now record an intensity modulated line on the storage band 1 in a direction transverse with respect to the direction of travel of the storage band 1, preferably in the form of modulation versus time, which appears on the storage band surface as a variable transversely charging deflection and, subsequently, as a corresponding length of dusted material of the individual picture element.

Other ways of modulation are possible, for example, intensity modulation of the surface acted upon by the beam spot for each picture point, whereby said surface may vary between zero and full coverage of the so-called elementary zone assigned to each single picture point. The intensity modulation occurs at a place where the luminescent screen comes closest to the storage band 1 guided on the roller 10 and virtually engages said storage band.

FIGURE 2 of the drawing illustrates more nearly the relative position and relative movement of the storage band 1 with respect to the photo-resistive layer 20, whereby the thickness of this layer is exaggerated. It can be recognized from this figure, that with a synchronized drive of the storage band 1 and the photo-resistive semi-conductive layer 20 time is gained for the decay of the photo-electric charge on the cylinder, so that the layer 20, upon one completed revolution of the cylinder 10, is ready for a new light energization. The rather slow decay of the conductivity of the layer 20, after exposure to the light rays can, for the same reason as mentioned before, be utilized to a great extent to complete the transfer of the biasing charge to the band 1 at the places exposed. Since the storage band 1 and the resistance layer 20 are not displaced with respect to one another during a considerable part of the rotation of the cylinder 10, blurring which might occur during the early decay period in the layer 20 is prevented.

A luminous screen 11 is suitably provided as a slowly rotating circular disc which is disposed with respect to the path of deflection of the cathode ray beam 12 in such a manner, that always different zones of luminous phosphorus are bombarded by said beam and, thereby, fading of the luminous substance is substantially decreased, as can be better derived from FIGURE 2. In this figure, a very thin and transparent screen carrier 21, supported by a clamping ring 23, is coated with a layer 22 of luminous phosphorus. Thin wire spokes (not shown) may be provided for mechanically supporting the clamping ring 23 on the rotating shaft in such a manner that, in case of a synchronized rotational speed of the luminous screen 11, these spokes cross the path of the cathode beam 12 only during the return sweeps of the line rasters, whereby the beam is not interrupted, so that the recording of the picture will be disturbed.

In FIGURE 1, a bushing 13 for the drive shaft of the liminous screen 11 is shown. A magnetic transverse deflection field for the beam 12 is produced by coils 14, while an auxiliary pair of electrodes 15 serves to provide the longitudinal modulation mentioned in the foregoing.

The locally charged storage band 1, which is discharged by means of the photo-electric resistance layer, is subsequently received in the dusting chamber 16, where a fine powder is brought so close to the band 1 by means of a roller 26, that the powder particles will follow the static force of attraction of the picture elements which remain charged, and these particles will thus be transferred to the band 1. If any powder adheres to discharged points, due to polarity forces, it will be thrown off in a vibration chamber 17 as a result of vibration generated therein by means of an ultrasonic generator 18. A partial vacuum is maintained in this vibration chamber 17. A final, faithful image of the picture signal recorded by the cathode beam 12 will be obtained on the storage band 1 in the form of a corresponding dust distribution. The picture or the picture sequence can be stored for any length of time by spraying a rapidly drying solution of a varnish or lacquer on the band 1 by means of a liquid spraying device 19. The carrier band may be entirely freed from the substances applied thereto and regenerated by means of suitable solvents.

A scanner device of conventional design, as used in the television technique, such as a film scanner, may be employed for reconverting the picture signal into its original form. A rotating luminous screen, analogous to the parts 11, 21, 22, and 23 of the drawing, may be provided in such a scanning device if designed so that the beam is always deflected in the same scanning line. A long life of the luminous substance is likewise assured by such arrangement.

Other means for picture scanning may be used for reproducing the signal from the sequence of stored picture signals, for example, tubes of the Vidicon type, of the image-orthicon type, etc., whereby an intermittent advance of the storage band in the scanning apparatus appears to be advisable in order to make full use of the storage action of the luminous effect in such tubes.

A cathode ray tube with an apertured Lenard window may be used in place of the cathode ray luminous screen system, whereby the direction of the aperture slot is transverse to the storage band. The modulated cathode beam penetrates the thin light metal foil closing the aperture and passes therethrough, impinging first on a luminous screen which, like the other components of the described apparatus, is provided in open air and operates therein. Thus, it will not be necessary to pass the storage band through vacuum chambers and the expense of vacuum pumps required for maintaining such vacuum will be saved.

The picture resolution obtainable in this manner, according to the present state of the art, is, however, inferior with respect to that obtained by the method of passing the storage band through a high vacuum, as shown in the drawing and described in the foregoing.

I claim:

1. The method of storing signals on a moving transparent storage band of insulating material comprising the steps of electrostatically charging the band uniformly; bringing the band into intimate contact with a surface of photosensitive resistive material moving in synchronism therewith; applying light through the storage band to the photo-sensitive material in a pattern of intensity representative of the signal to be stored to alter the resistance of the surface according to said pattern and thereby drain off local charges from the band according to said pattern, and maintaining the band in close contact with the photosensitive material subsequently to the light application.

2. In a method as set forth in claim 1, subsequently dusting said band with powder, and cementing the powder to said band in said pattern.

3. Apparatus for recording signals on a moving transparent storage band of insulating material, comprising a roller having a coating of photo-sensitive material on its periphery, the resistance of which varies with light intensity; drive means for driving the band in contact with the coating on the roller; electrode means for charging the band to a high electrostatic bias before it contacts the roller; and light means for applying light to the coating, through the band and at a place where the band is in close contact with the coating, in the intensity pattern characteristic of the signal to be stored, whereby the resistance of the coating is altered in accordance with the pattern and local charges from the band are drained off, thereby in effect electrostatically charging the band according to the signals.

4. In an apparatus according to claim 3, said light means comprising cathode ray means including a screen which is illuminated according to said pattern by a deflected beam intensity modulated according to said signals, said screen being placed very close to said coating; and an evacuated envelop surrounding the cathode ray means, the band and the roller.

5. In an apparatus according to claim 4, said band being interposed between said screen and said coating, the spacings therebetween being reduced to a minimum.

6. In an apparatus according to claim 4, said screen comprising a luminous member on a shaft, and drive means for rotating said shaft and screen so that the beam impinges on different areas of the screen during successive cycles of beam deflection.

7. In an apparatus according to claim 3, said coating being continuous on the cylindrical surface of said roller and said band being pressed thereagainst part way around the roller and beyond said light means so that the band contacts the coating during at least part of the persistency of the effect of the light upon the coating resistance, the persistency of the effect lasting an interval of time less than that required for one revolution of the roller.

References Cited in the file of this patent

UNITED STATES PATENTS

| | | |
|---|---|---|
| 2,277,013 | Carlson | Mar. 17, 1942 |
| 2,422,937 | Szegho | June 24, 1947 |
| 2,602,903 | Karlsson | July 8, 1952 |
| 2,716,048 | Young | Aug. 23, 1955 |
| 2,736,770 | McNaney | Feb. 28, 1956 |
| 2,777,745 | McNaney | Jan. 15, 1957 |
| 2,890,922 | Huebner | June 16, 1959 |
| 2,937,233 | Palmer | May 17, 1960 |